UNITED STATES PATENT OFFICE.

CARL RUMPFF, OF APRATH, NEAR ELBERFELD, PRUSSIA, GERMANY.

MANUFACTURE OF DYE-STUFF OR COLORING-MATTER.

SPECIFICATION forming part of Letters Patent No. 256,377, dated April 11, 1882.

Application filed January 9, 1882. (No specimens.)

*To all whom it may concern:*

Be it known that I, CARL RUMPFF, residing at Aprath, near Elberfeld, in the Kingdom of Prussia and Empire of Germany, have invented a new and useful Improvement in the Manufacture of Dye-Stuffs or Coloring-Matters, of which the following is a specification.

My invention relates to a new dye-stuff which results from the reaction of diazo-beta-naphthaline-monosulphonic acid with the soda salt of my alpha-monosulphonic acid of beta-naphthol.

The preparation and properties of my alpha-monosulphonic acid of beta-naphthol, and also of its sodium salt, are described in my application for patent filed April 8, 1881.

I prepare my new dye-stuff as follows: I dissolve one hundred kilograms of finely-powdered amido-beta-naphthaline-monosulphonic acid in one thousand liters of water. To this solution I add seventy-five kilograms of hydrochloric acid of 21° Baumé. I cool the mixture so prepared to from 3° centigrade to 6° centigrade, and then pour into it slowly a solution of twenty-five kilograms of sodium nitrite in one hundred kilograms of water. The mixture is now left at rest for several hours, when the desired chemical reaction will be completed—that is to say, the amido-beta-naphthaline-monosulphonic acid will be transformed into the diazo-beta-naphthaline-monosulphonic acid. In the next operation I slowly pour the mixture containing the diazo-beta-naphthaline-monosulphonic acid into a solution of one hundred and fifty kilograms of the sodium salt of my alpha-monosulphonic acid of beta-naphthol (crystallized from an alcohol solution) in one hundred kilograms of ammonia of ten per cent. strength. My new coloring-matter is the result of the reaction of the substances in solution. The following equation exhibits the changes more specifically:

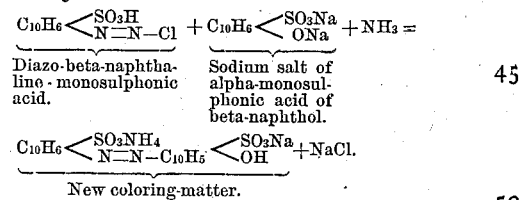

Diazo-beta-naphtha-    Sodium salt of
line-monosulphonic    alpha-monosul-
acid.                     phonic acid of
                           beta-naphthol.

New coloring-matter.

The new dye-stuff is to be precipitated out of its solution by common salt and purified by crystallization from water.

I claim—

As a new product, the dye-stuff or coloring-matter which results from the reaction of diazo-beta-naphthaline-monosulphonic acid with the sodium salt of the alpha-monosulphonic acid of beta-naphthol, substantially as described.

CARL RUMPFF.

Witnesses:
J. FERD. KEDENBURG,
FR. N. SCHULTER.